United States Patent
Hillermeier et al.

(10) Patent No.: US 7,444,312 B2
(45) Date of Patent: Oct. 28, 2008

(54) METHOD AND ARRANGEMENT FOR DESIGNING A TECHNICAL SYSTEM

(75) Inventors: Claus Hillermeier, Üebersee (DE); Annelie Stoehr, Munich (DE)

(73) Assignee: Siemens Aktiengesellschaft, Munich (DE)

(*) Notice: Subject to any disclaimer, the term of this patent is extended or adjusted under 35 U.S.C. 154(b) by 585 days.

(21) Appl. No.: 10/524,556

(22) PCT Filed: Jul. 30, 2003

(86) PCT No.: PCT/DE03/02566

§ 371 (c)(1),
(2), (4) Date: Feb. 14, 2005

(87) PCT Pub. No.: WO2004/021209

PCT Pub. Date: Mar. 11, 2004

(65) Prior Publication Data

US 2005/0256683 A1 Nov. 17, 2005

(30) Foreign Application Priority Data

Aug. 14, 2002 (DE) ............................... 102 37 335

(51) Int. Cl.
*G06F 17/00* (2006.01)
*G06F 5/00* (2006.01)
(52) U.S. Cl. ................... 706/45; 703/1; 703/2
(58) Field of Classification Search ........................ None
See application file for complete search history.

(56) References Cited

U.S. PATENT DOCUMENTS 5,361,628 A * 11/1994 Marko et al. .................. 73/116

5,592,791 A * 1/1997 D'Annunzio et al. ...... 52/167.2

(Continued)

FOREIGN PATENT DOCUMENTS

JP 2001-166806 6/2001

(Continued)

OTHER PUBLICATIONS

The intelligent automatic support system of machine building products principal designer Dvoryankin, A.M.; Kamaev, V.A.; Kizim, A.V.; Artificial Intelligence Systems, 2002. (ICAIS 2002). 2002 IEEE International Conference on Sep. 5-10, 2002 pp. 177-179 Digital Object Identifier 10.1109/ICAIS.2002.1048083.*

(Continued)

*Primary Examiner*—Michael B Holmes
(74) *Attorney, Agent, or Firm*—Staas & Halsey LLP

(57) ABSTRACT

In a method for designing a technical system, a technical system is modeled by a predetermined quantity of target functions depending on parameters, each individual target function being weighted with a weighting factor. The method solves a system of equations comprising the parameters and the weighting factors as variables in a variable space, solutions of the system of equations forming working points of a solution space in the variable space. The working points are determined by a predictor-corrector method, according to which a predictor produced by a stochastic variable is determined in the variable space, from a first working point, and a second working point is then determined in a correcting step. The determined working points are used to design the technical system. The method can be used to redesign, modify or adapt an already existing technical system.

21 Claims, 3 Drawing Sheets

U.S. PATENT DOCUMENTS

| | | | | |
|---|---|---|---|---|
| 5,615,109 | A | * | 3/1997 | Eder .............................. 705/8 |
| 5,650,728 | A | * | 7/1997 | Rhein et al. ................. 324/543 |
| 5,684,713 | A | * | 11/1997 | Asada et al. .................. 716/19 |
| 6,064,916 | A | | 5/2000 | Yoon |
| 6,292,830 | B1 | * | 9/2001 | Taylor et al. ................ 709/224 |
| 6,381,505 | B1 | * | 4/2002 | Kassmann et al. ............ 700/44 |
| 6,387,034 | B1 | * | 5/2002 | Lee ............................... 600/1 |
| 6,526,373 | B1 | | 2/2003 | Barral |
| 6,529,934 | B1 | * | 3/2003 | Kawamura et al. .......... 718/102 |
| 6,530,873 | B1 | * | 3/2003 | Lee ............................... 600/1 |
| 6,601,233 | B1 | * | 7/2003 | Underwood ................ 717/102 |
| 6,609,128 | B1 | * | 8/2003 | Underwood ................. 707/10 |
| 6,633,878 | B1 | * | 10/2003 | Underwood ................ 707/100 |
| 6,714,899 | B2 | * | 3/2004 | Kassmann ...................... 703/2 |
| 6,801,810 | B1 | * | 10/2004 | Poncet ......................... 700/12 |
| 6,820,036 | B2 | * | 11/2004 | Kitamura et al. ............ 702/182 |
| 6,999,884 | B2 | * | 2/2006 | Astley et al. .................. 702/56 |
| 7,016,934 | B2 | * | 3/2006 | Kawamura et al. .......... 709/202 |
| 7,043,409 | B1 | * | 5/2006 | Schaffler et al. ............... 703/2 |
| 7,058,553 | B1 | * | 6/2006 | Kodes ........................... 703/2 |
| 7,165,465 | B2 | * | 1/2007 | De Lair et al. ........... 73/862.326 |
| 7,185,318 | B1 | * | 2/2007 | Zimmerer ................... 717/124 |
| 7,191,073 | B2 | * | 3/2007 | Astley et al. .................. 702/56 |
| 7,194,317 | B2 | * | 3/2007 | Kothare et al. ................ 700/29 |
| 7,289,940 | B2 | * | 10/2007 | Altpeter et al. ................ 703/2 |
| 7,330,806 | B2 | * | 2/2008 | Reohr, III ...................... 703/6 |
| 7,400,108 | B2 | * | 7/2008 | Minor et al. ........... 318/568.12 |
| 2002/0065636 | A1 | | 5/2002 | Yamaguchi et al. |

FOREIGN PATENT DOCUMENTS

| | | |
|---|---|---|
| WO | WO99/66434 | 12/1999 |
| WO | WO00/34850 | 6/2000 |
| WO | WO00/65412 | 11/2000 |
| WO | WO01/07972 | 2/2001 |

OTHER PUBLICATIONS

Design and Application of Static Logic Directors Sterrett, John D.; Washburn, Darl C.; Industry Applications, IEEE Transactions on vol. IA-9, Issue 4, Jul. 1973 pp. 410-415 Digital Object Identifier 10.1109/TIA.1973.349969.*

Designing industrial systems with a weak utility supply Halpin, S.M.; Smith, J.W.; Litton, C.A.; Industry Applications Magazine, IEEE vol. 7, Issue 2, Mar.-Apr. 2001 pp. 63-70 Digital Object Identifier 10.1109/2943.911191.*

Dynamical system design from a control perspective: finite frequency positive-realness approach Iwasaki, T.; Hara, S.; Yamauchi, H.; Automatic Control, IEEE Transactions on vol. 48, Issue 8, Aug. 2003 pp. 1337-1354 Digital Object Identifier 10.1109/TAC.2003. 815013.*

Technical Considerations in Electrical and Mechanical System Design of Taipei Mass Rapid Transit System Extension Projects Jih-Wen Sheu; Wei-Song Lin; Industrial Electronics Society, 2007. IECON 2007. 33rd Annual Conference of the IEEE Nov. 5-8, 2007 pp. 762-768 Digital Object Identifier 10.1109/IECON.2007. 4460367.*

A two level approach to reactive planning in power systems Rouhani, R.; Usoro, P.B.; Lebow, W.; Mehra, R.K.; Decision and Control, 1983. The 22nd IEEE Conference on vol. 22, Part 1, Dec. 1983 pp. 1422-1428 Digital Object Identifier 10.1109/CDC.1983.269775.*

Multivariable Second Order Sliding Mode Control of Mechanical Systems Punta, E.; Decision and Control, 2006 45th IEEE Conference on Dec. 13-15, 2006 pp. 4939-4944 Digital Object Identifier 10.1109/CDC.2006.376980.*

Joint Space Controller Design for Electrohydraulic Servos Davliakos, I.; Zafiris, A.; Papadopoulos, E.; Computer-Aided Control Systems Design, 2006 IEEE International Symposium on Oct. 4-6, 2006 pp. 796-801 Digital Object Identifier 10.1109/CACSD. 2006-285446.*

The relevancy of environmental parameter space for electrical insulation design in aerospace vehicles Schweickart, D.L.; Horwath, J.C.; Hatfield, L.L.; Krompholz, H.; Walko, L.C.; Power Modulator Symposium 2004 and 2004 High-Voltage Workshop. Conference Record of the Twenty-Sixth International May 23-26, 2004 pp. 30-33.*

A fuzzy approach for definition of dangerous zone in industrial systems Shakrokhi, M.; Bernard, A.; Systems, Man and Cybernetics, 2004 IEEE International Conference on vol. 7, Oct. 10-13, 2004 pp. 6318-6324 vol. 7 Digital Object Identifier 10.1109/ICSMC.2004. 1401392.*

Teaching functional decomposition for the design of electrical and computer systems Coulston, C.; Ford, R.M.; Frontiers in Education, 2004. FIE 2004. 34th Annual 2004 pp. F4G-6-11 vol. 2 Digital Object Identifier 10.1109/FIE.2004.1408669.*

Development of an e-engineering environment for mechanical systems design and optimization Qi Hao; Weiming Shen; Zhan Zhang; Seong-Whan Park; Jai-Kyung Lee; Computer Supported Cooperative Work in Design, 2004. Proceedings. The 8th International Conference on vol. 2, May 26-28, 2004 pp. 251-258 vol. 2 Digital Object Identifier 10.1109/CACWD.*

Customizing the development of long-range load projections for electrical utility planning studies Hager, G.E.; McDonald, B.; Rural Electric Power Conference, 2003 May 4-6, 2003 pp. D1-1-D1-4.*

Design of advanced leg module for humanoid robotics project of METI Kaneko, K.; Kajita, S.; Kanehiro, F.; Yokoi, K.; Fujiwara, K.; Hirukawa, H.; Kawasaki, T.; Hirata, M.; Isozumi, T.; Robotics and Automation, 2002. Proceedings. ICRA '02. IEEE International Conference on vol. 1, May 11-15, 2002 pp. 38-45 vol. 1.*

On subjectivity in focal engineerng Moriarty, G.; Julliard, Y.; Technology and Society, 2001. Proceedings. International Symposium on Jul. 6-7, 2001 pp. 177-184 Digital Object Identifier 10.1109/ISTAS. 2001.937736.*

C. Hillermeier: "Nonlinear Multiobjective Optimization: A Generalized Homotopy Approach", Chapters 1-3, Birkhäuser Verlag, 2001, pp. 1-42.

C. Hillermeier: "A Generalized Homotopy Approach to Multiobjective Optimization", Journal of Optimization Theory and Application, vol. 110/3, pp. 557-583, Plenum Press, New York, 2001.

* cited by examiner

METHOD AND ARRANGEMENT FOR DESIGNING A TECHNICAL SYSTEM

CROSS REFERENCE TO RELATED APPLICATIONS

This application is based on and hereby claims priority to PCT Application No. PCT/DE2003/002566 filed on Jul. 30, 2003 and German Application No. 102 37 335.3 filed on Aug. 14, 2002, the contents of which are hereby incorporated by reference.

BACKGROUND OF THE INVENTION

The invention relates to a method and an arrangement for designing a technical system.

In order to design a complex technical system it is often necessary to optimize the system with respect to a plurality of contradictory criteria. The criteria influence target functions of the system, such as, for example, manufacturing costs or efficiency. In addition, possible operating points of the system can be restricted by auxiliary conditions. This leads to the problem of determining a set of optimal operating points for the system, that is to say the set of possible operating points of the system with which it is not possible to optimize the operating points further simultaneously with regard to all criteria. From the set of optimal points, individual users can then select the most suitable operating points of the system for their applications while taking into account secret criteria or expert knowledge.

A weighting method for optimizing technical systems with respect to a plurality of criteria is known from C. Hillermeier: "Nonlinear Multiobjective Optimization: A Generalized Homotopy Approach", Chapter 3.2, Birkhäuser Verlag, 2001 ("the Hillermeier Chapter 3.2 reference"), wherein scaling parameters are employed to apply transformations to scalar-value optimization problems. This method has the disadvantage that it is numerically very involved, because very many scalar-value optimizations have to be performed. Furthermore, the selection and variation of the scaling parameters necessitates an interaction with a user and in this respect cannot be automated.

A stochastic method for optimizing technical systems with respect to a plurality of criteria, wherein a stochastic differential equation is used to solve the optimization problem, is described in C. Hillermeier: "Nonlinear Multiobjective Optimization: A Generalized Homotopy Approach", Chapter 3.3, Birkhäuser Verlag, 2001. This method has the disadvantage that it are very involved in numerical terms, because a multiplicity of quadratic optimization problems have to be solved. A further disadvantage lies in the fact that with the method, the individual target functions are not weighted, as a result of which important information for selecting an optimal point is not available to the user.

A homotopy method for optimizing technical systems with respect to multiple criteria, wherein in addition to weighting factors for the target functions, Lagrange multipliers are used in order to take auxiliary conditions into account, is known from C. Hillermeier: "A Generalized Homotopy Approach to Multiobjective Optimization", Journal of Optimization Theory and Application, Vol. 110/3, pp. 557-583, Plenum Press, New York, 2001 ("the Hillemermeier Vol. 110/3 reference"). The disadvantage of this method lies in the fact that an interaction with the user is necessary and in this respect the method cannot be automated.

SUMMARY OF THE INVENTION

One possible object of the invention is therefore to create an automated and numerically efficient method for designing a technical system.

The inventors propose a method for designing a technical system in which the technical system is modeled by a predetermined set of target functions which are dependent on parameters. In this modeling process each individual target function is weighted with a weighting factor. The method solves an equation system comprising the parameters and the weighting factors as variables in a variable space, with solutions of the equation system forming operating points of a solution space in the variable space. In the method the operating points are determined by a predictor-corrector method, according to which, starting from a first operating point, a predictor generated by a stochastic variable is determined in the variable space, and subsequently, in a corrector step, a second operating point is determined. The determined operating points are used here to design the technical system. The method can be used to design a new technical system or modify or, as the case may be, adapt an existing technical system.

An advantage resides in the fact that the method is automated through the generation of the predictor by a stochastic variable and so there is no longer any need for intervention on the part of the user. The linking of the numerical predictor-corrector method with stochastic methods guarantees efficient use of the computer resources for calculating operating points of a technical system.

In an advantageous embodiment the predictor is predetermined by random numbers, so that in particular during the execution of the method a random number generator can be used and through this, the automation of the method is ensured in a simple manner.

In a further particularly advantageous embodiment the random numbers are normally distributed. What this achieves is that the trajectory of operating points which forms in the solution space during the execution of the method ensures a uniform distribution in the entire solution space and so ensures good coverage of all possible operating points. As a result of the use of normally distributed random numbers, in particular a Brownian movement on the solution space can be modeled by the method.

Preferably the operating points which are determined by the method are what are known as pareto-optimal points which cannot be optimized further in relation to all target functions. In the method, in particular the points with positive weighting factors in the solution space are selected as operating points.

In a further advantageous embodiment the operating points must also satisfy one or more auxiliary conditions, with the or each auxiliary condition being represented by a further variable of the equation system in the variable space. In this case the auxiliary conditions can be equality auxiliary conditions and/or inequality auxiliary conditions. With inequality auxiliary conditions a slack variable is preferably introduced, by which the inequality auxiliary conditions can be transformed into equality auxiliary conditions. The use of slack variables will be explained in more detail in the detailed description of an exemplary embodiment.

The solution space of the operating points is preferably a manifold, in particular a submanifold in the variable space. In the Hillemermeier Vol. 110/3 reference it is explained under what preconditions the solution space forms such a manifold.

Since in particular at the start of the method a first operating point is present initially, in a special embodiment this first valid operating point is determined by a weighting method, the use of weighting methods already being known from the related art (see the Hillermeier Chapter 3.2 reference).

With the predictor-corrector method, which may be used in the invention, a tangential plane to the solution space is determined, preferably in the first operating point, and the predictor is then specified in the tangential plane.

In a development of the method, if a negative predictor with one or more negative weighting factors occurs, a new predictor is determined by a reflection at a subplane of the solution space of the valid operating points. Through this, new regions of valid operating points can be determined, which operating points can be of particular relevance to the user in terms of secret supplementary criteria or his/her expert knowledge.

In a preferred embodiment, in the reflection step a point of intersection of the trajectory that runs between the first operating point and the negative predictor with a subplane of the solution space is determined. The tangential component of the vector spanned by the point of intersection and the negative predictor to the relevant subplane of the solution space is then determined, with those weighting factors which were negative for the negative predictor in the points of the subplane now being equal to zero. Next, the normal component, associated with the tangential component, of the vector spanned by the point of intersection and the negative predictor is determined. Finally, the new predictor is determined by two times subtraction of the normal component from the negative predictor.

A Newton method known from the related art, which method is easily convertible numerically, is preferably used for the corrector method.

The operating points are preferably determined by iterations of the predictor-corrector method, with the second operating point of the preceding iteration step being used in a current iteration step as the first operating point of the predictor-corrector method. In this case the method is terminated by, for example, an abort condition. In an advantageous embodiment the abort condition is met when a predetermined number of operating points has been determined and/or a predetermined time limit has been reached.

In addition to the above-described method for designing a technical system, the inventors propose an arrangement for designing a technical system by which the above-described method can be performed. In particular the method comprises a processor unit by which it is made possible for the predictor to be generated using a stochastic variable.

The arrangement preferably comprises a random number generator for generating random numbers which represent the stochastic variable.

The inventors also propose a computer program product which has a storage medium on which is stored a computer program which is executable on a computer and executes the design method.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
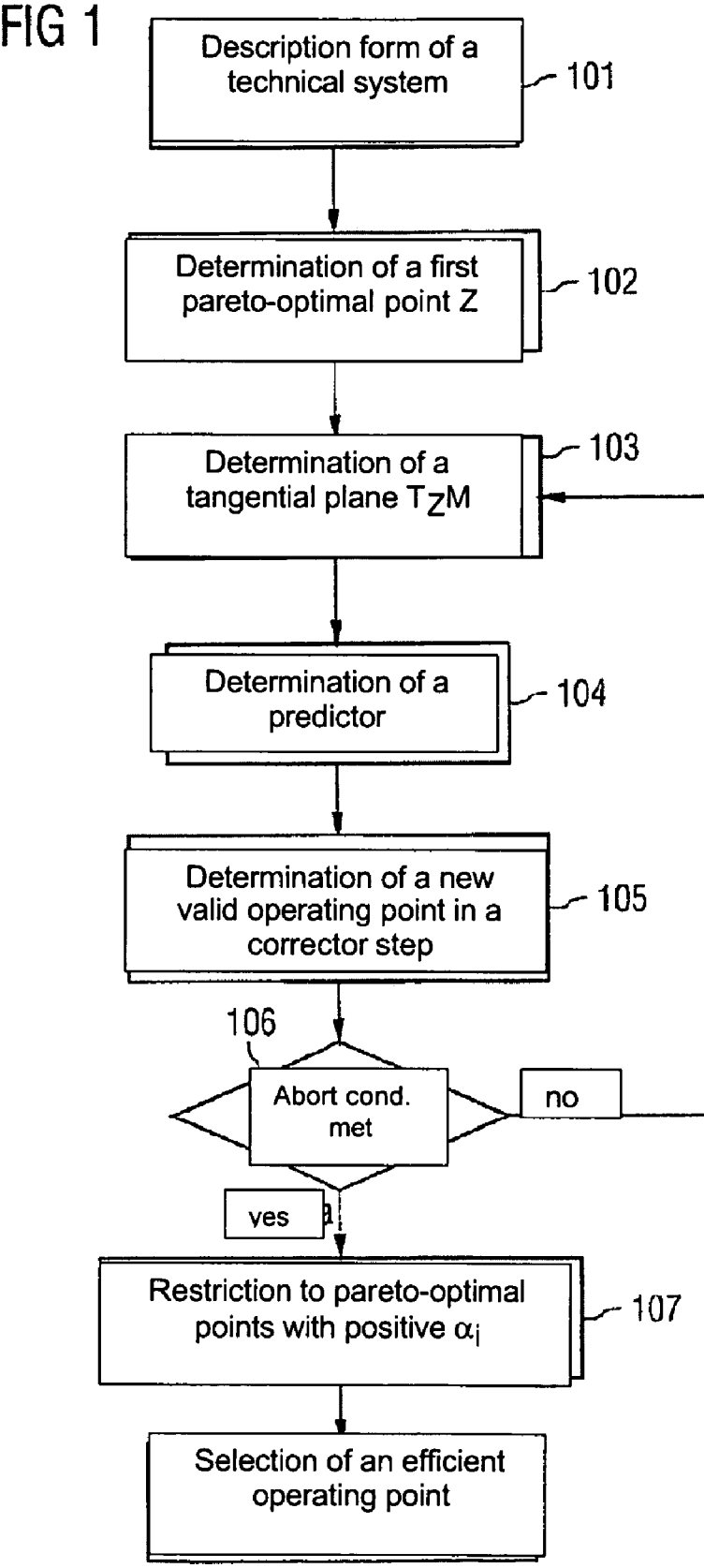
FIG. 1 shows a flowchart of the method according to one embodiment of the invention for designing a technical system.

Reference will now be made in detail to the preferred embodiments of the present invention, examples of which are illustrated in the accompanying drawings, wherein like reference numerals refer to like elements throughout.

A flowchart of a method for designing a technical system is shown in FIG. 1.

First, in step 101, a description form of the technical system is selected. The description form comprises a predetermined number k of target functions f=(f1, ..., fk), with each of the target functions being dependent on n predetermined parameters $x_1$ to $x_n$ of the technical system. The target functions are for example the investment costs $f_1$ and the efficiency $f_2$ of the technical system. In this case the target functions are described by the following equation:

$$\underline{f}(x) = \begin{pmatrix} f_1(x) \\ f_2(x) \end{pmatrix} = \begin{pmatrix} \text{Investment} \cdot \text{costs}(\underline{x}) \\ \_\text{Efficiency}(\underline{x}) \end{pmatrix}$$

where $x=(x_1, \ldots, x_n)$.

The parameters $x_1$ to $x_n$ can be configuration parameters or operating parameters of the technical system.

By the method the valid operating points which are used for the design of the technical system are determined by the optimization of the target functions with respect to the parameters, whereby not all target functions $f_1$ to $f_k$ can be optimized simultaneously since the optimization criteria are generally in competition with one another.

The technical system is further limited in the valid operating points by a predetermined number m of auxiliary conditions $h=(h_1(x) \ldots, h_m(x))$ which can be expressed by the following equation:

$$h(x)=0$$

where $0=(0, \ldots, 0)$ represents a zero vector. In this case what is involved is an equality auxiliary condition, with an inequality auxiliary condition also being able to be considered as an alternative. An inequality condition of this kind is, for example:

$$h(x)<0 \text{ or } h(x)>0.$$

In order to solve the optimization problems by inequality auxiliary conditions, a number m of slack variables $s=(s_1, \ldots, s_m)$ are introduced, by which the inequality auxiliary conditions can be transformed into the following equality auxiliary conditions:

$$h(x)+s=0 \text{ or } h(x)-s=0$$

With the optimization method described in the present embodiment, the valid operating points are known as pareto-optimal points, which satisfy the following condition:

$$\min_{\underline{x} \in R}\{\underline{f}(\underline{x})\}, R=\{x \in \mathfrak{R}^n | \underline{h}(\underline{x})=0\}$$

It can be shown that the solutions of this optimization problem are the solutions of the following nonlinear equation systems:

$$F(x, \underline{\lambda}, \underline{a}) = \begin{pmatrix} \sum_{i=1}^{k} \alpha_1 \cdot \nabla f_1(\underline{x}) + \sum_{j=1}^{m} \lambda_j \cdot \nabla h_j(\underline{x}) \\ \underline{h}(\underline{x}) \\ \sum_{i=1}^{k} \alpha_1 - 1 \end{pmatrix} = \underline{0}$$

In this case the auxiliary conditions are taken into account by the Lagrange multipliers $\lambda = (\lambda_1, \ldots, \lambda_m,)$ and the target functions $f_i$ are weighted with weighting factors $\alpha_i$, whereby care must be taken to ensure that the total of all weighting factors is normalized to one, i.e. $\Sigma_{i=1}^{k}\alpha_1 - 1 = 0$. In this case, in particular, the individual weighting factors $\alpha_i$ can also be negative or equal to zero. The solutions of the optimization problem are therefore vectors $(x, \lambda, \alpha)$ in the (n+m+k)-dimensional variable space of the above equation system.

As shown in the Hillemermeier Vol. 110/3 reference, under certain conditions the solutions of this equation system describe a (k−1)-dimensional submanifold M in the variable space.

The below described numerical steps for determining valid operating points are essentially based on the homotopy method described in the Hillemermeier Vol. 110/3 reference, wherein a predictor-corrector method is used for determining pareto-optimal points.

In step 102, proceeding from the description form 101 of the technical system, a first pareto-optimal point z is determined by a standard method such as, for example, the weighting method.

In this first pareto-optimal point, in the next step 103, a (k−1)-dimensional tangential plane $T_ZM$ to the manifold M of the valid operating points is determined in point z. Toward that end, a Jacobi matrix of the equation system F in point z is subjected to a QR factorizing. From this, an orthonormal basis $\{q1 \ldots q_{k-1}\}$ is then determined which spans the tangential plane. The individual numerical steps performed in this process are described in detail in the Hillemermeier Vol. 110/3 reference.

In the next step 104, a predictor y is determined in this tangential plane, with the predictor—in contrast to the homotopy method described in the Hillemermeier Vol. 110/3 reference—being generated by a normally distributed random number vector b of the dimension k−1 in the tangential plane. In this case the predictor y has the following form:

$$y = z + (q_1 \ldots q_{k-1})b$$

Through the use of a random number vector such as this, a Brownian movement can be modeled on the submanifold M, with the Brownian movement being able to be represented approximately as follows:

$$dZ_t = \epsilon P(Z_t) dB_t$$

where $P(z)$ is a projection matrix onto the tangential plane $T_ZM$ in the valid operating point z, $\epsilon$ is a scaling factor, and $B_t, t \in \Re_0^+$ is a Brownian movement in the variable space.

In order to model this movement, the k−1-dimensional normal distribution $N(0_{k-1}, t\Delta \epsilon I_{k-1})$ is selected for b, where the mean value $0_{k-1}$ is the (k−1)-dimensional zero vector and the variance is the (k−1)-dimensional identity matrix $I_{k-1}$ multiplied by a step increment $t_\Delta$ of the Brownian movement and the scaling factor $\epsilon$.

An alternative method of determining the predictor is first to determine a normally distributed random number vector in the (m+n+k)-dimensional variable space and then to project the vector into the (k−1)-dimensional tangential plane $T_ZM$.

After this, in step 105, the predictor is projected with the aid of a corrector method, which is, for example, a numerical Newton method, onto the manifold of the pareto-optimal points. In this way a new valid operating point is determined on the manifold of the pareto-optimal points.

The steps 103, 104 and 105 are repeated iteratively, with the operating point determined in the preceding iteration step being used as the starting point for calculating a new valid operating point.

In step 106 a check is made to determine whether an abort criterion has been met, in other words whether, for example, a predetermined number of iterations have been performed or a predetermined time limit has been reached. If this is not the case, a return is made to step 103 and the next iteration is performed. This is continued until the abort criterion is met.

Once the abort criterion has been met in step 106, in a next step 107 the set of determined pareto-optimal points is restricted to those points in which the weighting factors $\alpha_i$ are positive.

From these pareto-optimal points, in a final step 108, the user selects an efficient operating point of the technical system appropriate to his/her requirements and the technical system is designed using this efficient operating point.

Figure 2:
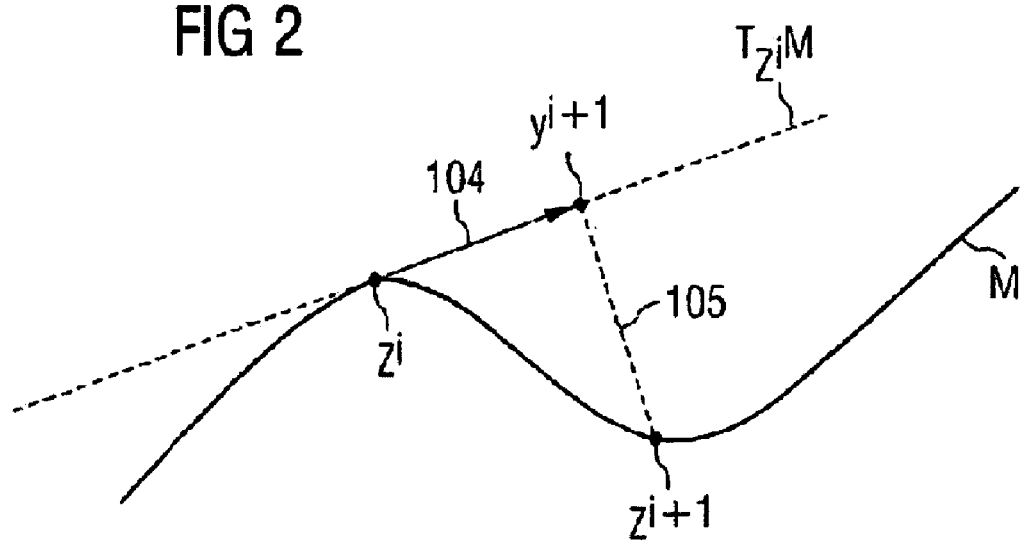
FIG. 2 shows a diagram which illustrates the predictor-corrector method used in one embodiment of the invention.

FIG. 2 shows a two-dimensional graphical representation of the predictor-corrector method, which may be used in the design method.

In FIG. 2, $z^i$ designates a pareto-optimal point on the submanifold M, with this point having been obtained in the i-th iteration step of the method. In order to determine a new pareto-optimal point, the tangential plane $T_{z^i}M$ to the submanifold M is first determined in the point $z^i$. The tangential plane is indicated by dashed lines in FIG. 2. In the next step 104, a predictor point $y^{i+1}$ is then determined using normally distributed random numbers in the tangential plane $T_{z^i}M$. In the following corrector step 105, which can be, for example, a Newton method, the new pareto-optimal point $z^{i+1}$ is determined. The method is then continued, with the pareto-optimal point $z^{i+1}$ being used as the starting point for new predictor step.

Figure 3:
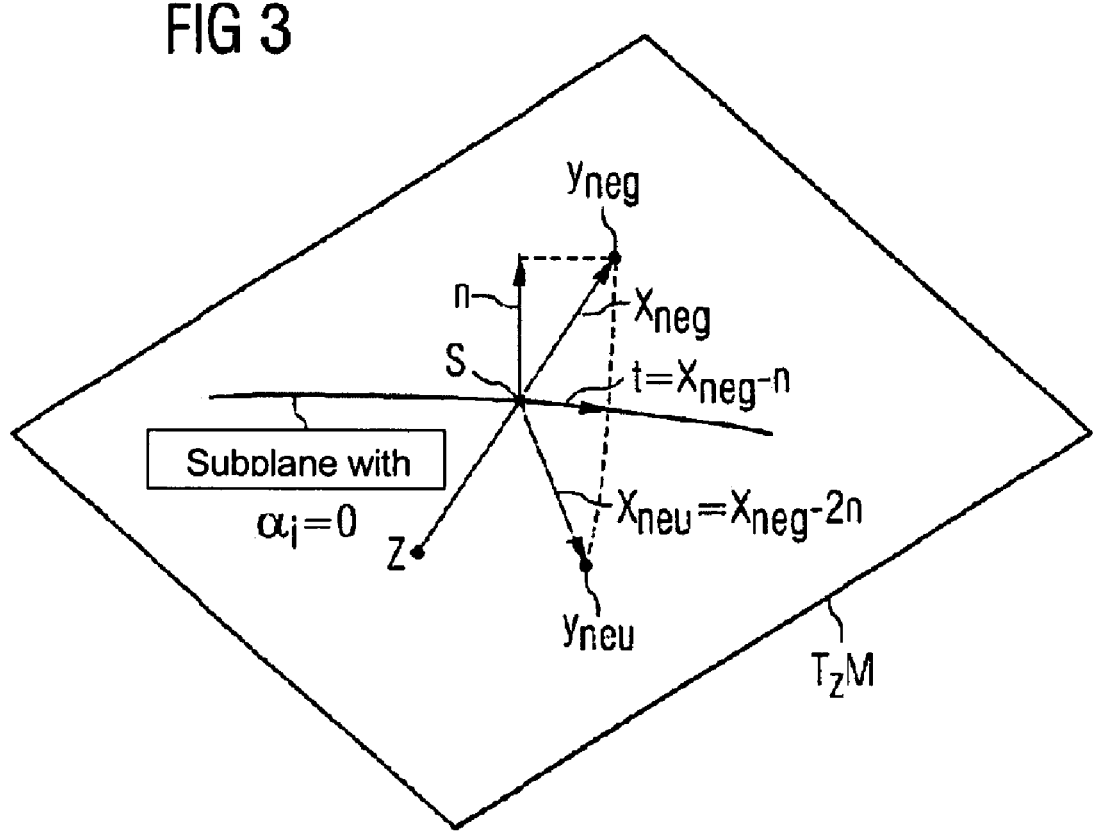
FIG. 3 shows a diagram which illustrates the reflection method used in an alternative embodiment of the invention.

FIG. 3 relates to a variation of the method, wherein if predictors with negative weighting factors $\alpha_i$ occur, a reflection is performed in order to determine a new predictor with positive $\alpha_i$. FIG. 3 shows this projection step being performed in a three-dimensional representation.

FIG. 3 depicts a case in which, starting from a pareto-optimal point z, a predictor $y_{neg}$ is determined which has a negative $\alpha_i$. This is illustrated graphically in that the section between the point z and the point y penetrates the tangential plane $T_ZM$ in the point S. In this case the point S in turn lies on a subplane of the tangential plane $T_ZM$, for the points of which the coordinate $\alpha_i$ has the value zero. In order to perform the reflection, the point of intersection S is determined first. This can be done using a projection operator which projects the $\alpha_i$ component from a parameter representation of the straight line running through the points z and y. After the point S has been determined, the vector xneg running between S and y can now be determined. This vector is then dissected into the tangential component t to the subplane and into a normal component n. Thus, $t = x_{neg} - n$ applies to the tangential component. The reflection step is then performed, with the new reflected vector $x_{neu}$ having the same tangential component t as the old vector $x_{neg}$ and the normal component corresponding to the normal component n of the old vector $x_{neg}$ with the sign reversed. The new vector is therefore $x_{neu}=t-n=(x_{neg}-n)-n=X_{neg}-2n$. There thus results a new predictor $y_{neu}$ which was reflected at the tangential plane $T_ZM$. $y_{neu}=S+X_{neu}$ applies to the new predictor point $y_{neu}$. The above described reflection method increases the numerical efficiency of the method since the generation of points with negative weighting factors $\alpha_i$ is avoided and consequently the technical computing resources are used more efficiently.

Figure 4:
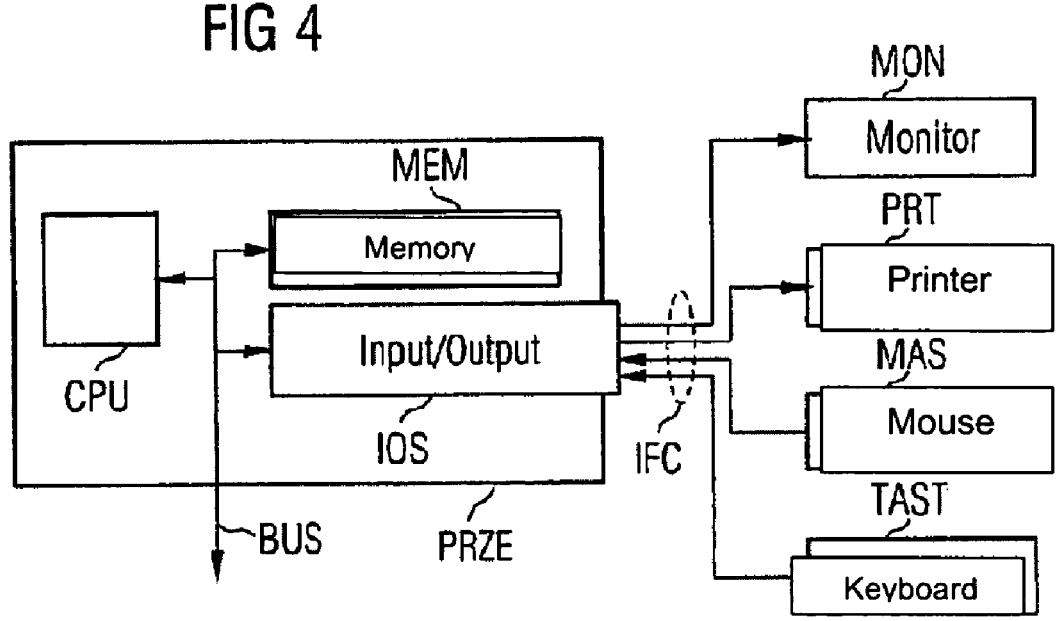
FIG. 4 shows a processor unit for performing the method according to one embodiment of the invention.

FIG. 4 shows a processor unit PRZE for performing the method. The processor unit PRZE comprises a processor CPU, a memory MEM and an input/output interface IOS which is used in a different way via an interface IFC: An output is made visible on a monitor MON via a graphical interface and/or output on a printer PRT. An input is made via a mouse MAS or a keyboard TAST. The processor unit PRZE also has a data bus BUS which provides the connection from a memory MEM, the processor CPU and the input/output interface IOS. Additional components such as, for example, additional memory, data storage (hard disk) or scanner can also be connected to the data bus BUS.

The invention has been described in detail with particular reference to preferred embodiments thereof and examples, but it will be understood that variations and modifications can be effected within the spirit and scope of the invention covered by the claims which may include the phrase "at least one of A, B and C" or a similar phrase as an alternative expression that means one or more of A, B and C may be used, contrary to the holding in *Superguide v. DIRECTV*, 69 USPQ2d 1865 (Fed. Cir. 2004).

The invention claimed is:

1. A method for designing a technical system having a predetermined set of target functions which are dependent on parameters, comprising:
    weighting each individual target function with a weighting factor;
    solving an equation system in a variable space to produce operating points in a solution space, the equation system having the parameters and the weighting factors as variables, the equation system being solved by a predictor-corrector method comprising:
        generating a first operating point by determining a predictor as a stochastic variable in the variable space; and
        after generating the first operating point, generating a second operating point using a corrector method; and
    using the operating points to design the technical system.

2. The method as claimed in claim 1, wherein the predictor is determined by random numbers.

3. The method as claimed in claim 2, wherein the random numbers are normally distributed.

4. The method as claimed in claim 1, wherein the stochastic variable relates to a stochastic process $Z_t$ which satisfies the following equation:

$$dZ_t=\epsilon P(Z_t)dB_t$$

where
    P(z) is a projection matrix onto a space tangential to the solution space in a valid operating point z,
    $\epsilon$ is a scaling factor, and
    $B_t, t \in \Re_0^+$ is a Brownian movement in the variable space.

5. The method as claimed in claim 1, wherein pareto-optimal points are determined as the operating points.

6. The method as claimed in claim 1, wherein the operating points are points with positive weighting factors in the solution space.

7. The method as claimed in claim 1, wherein the operating points satisfy one or more auxiliary conditions, with each auxiliary condition being represented by a further variable of the equation system in the variable space.

8. The method as claimed in claim 7, wherein the auxiliary conditions are equality auxiliary conditions and/or inequality auxiliary conditions.

9. The method as claimed in claim 8, wherein inequality auxiliary conditions are transformed into equality auxiliary conditions by a slack variable.

10. The method as claimed in claim 1, wherein the solution space is a submanifold in the variable space.

11. The method as claimed in claim 1, wherein the first operating point is generated by a weighting method.

12. The method as claimed in claim 1, wherein in generating the first operating point, plane tangential to the solution space is determined and the predictor is determined in said plane.

13. The method as claimed in claim 1, wherein if a negative predictor associated with a negative weighting factor occurs, a new predictor is determined by a reflection at a subplane of the solution space having the operating points.

14. The method as claimed in claim 13, wherein
    a point of intersection of a trajectory which runs between the first operating point and the negative predictor with the subplane of the solution space is determined;
    a tangential component of a vector spanned by the point of intersection and the negative predictor is determined at a subplane of the solution space, the weighting factor for the negative predictor now being equal to zero;
    a normal component, associated with the tangential component, of the vector spanned by the point of intersection and the negative predictor is determined;
    the new predictor is determined as twice the difference of the normal component from the negative predictor.

15. The method as claimed in claim 1, wherein the corrector method is a Newtonian method.

16. The method as claimed in claim 1, wherein the operating points are determined by iterations of the predictor-corrector method, with the second operating point of a preceding iteration step being used in a current iteration step as the first operating point of the predictor-corrector method.

17. The method as claimed in claim 16, wherein the iterations are terminated by an abort condition.

18. The method as claimed in claim 17, wherein the abort condition is satisfied when a predetermined number of operating points has been determined and/or a predetermined time limit has been reached.

19. A system for designing a technical system having a predeterminable set of target functions which are dependent on parameters, comprising;
    a weighting unit to weight each individual target function with a weighting factor;
    a processor to solve an equation system having the parameters and the weighting factors as variables in a variable space, the solutions of the equation system forming operating points of a solution space in the variable space, the operating points being determined by a predictor-corrector method comprising:
        generating a first operating point by determining a predictor as a stochastic variable in the variable space; and
        after generating the first operating point, generating a second operating point in a corrector step; and
    an output unit to output the operating points for the design of the technical system.

20. The system as claimed in claim 19, further comprising a random number generator for generating the stochastic variable.

21. A computer readable medium on which is stored a computer program to perform a method for designing a technical system having a predetermined set of target functions which are dependent on parameters, the method comprising:

weighting each individual target function with a weighting factor;

solving an equation system in a variable space to produce operating points in a solution space, the equation system having the parameters and the weighting factors as variables, the equation system being solved by a predictor-corrector method comprising:

generating a first operating point by determining a predictor as a stochastic variable in the variable space; and after generating the first operating point, generating a second operating point in a corrector step; and using the operating points to design the technical system.

* * * * *